(12) United States Patent  
Gamet et al.

(10) Patent No.: US 8,908,399 B2
(45) Date of Patent: Dec. 9, 2014

(54) REGULATION DEVICE FOR A CHARGE PUMP GENERATOR AND CORRESPONDING REGULATION METHOD

(75) Inventors: Stéphane Gamet, Grenoble (FR); Joël Damiens, La Motte Servolex (FR)

(73) Assignee: STMicroelectronics SA, Montrouge (FR)

( * ) Notice: Subject to any disclaimer, the term of this patent is extended or adjusted under 35 U.S.C. 154(b) by 500 days.

(21) Appl. No.: 12/782,098

(22) Filed: May 18, 2010

(65) Prior Publication Data

US 2010/0295520 A1 Nov. 25, 2010

(30) Foreign Application Priority Data

May 19, 2009 (FR) ...................................... 09 53330

(51) Int. Cl.
H02M 3/07 (2006.01)
(52) U.S. Cl.
CPC ...................................... H02M 3/07 (2013.01)
USPC .............................. 363/59; 323/266; 327/536
(58) Field of Classification Search
USPC .................. 323/282, 288, 351, 266; 327/536; 363/59, 60
See application file for complete search history.

(56) References Cited

U.S. PATENT DOCUMENTS

| 6,577,514 | B2* | 6/2003 | Shor et al. ....................... 363/59 |
| 6,643,151 | B1* | 11/2003 | Nebrigic et al. ................. 363/59 |
| 8,102,157 | B2* | 1/2012 | Abe ............................... 320/166 |
| 2002/0110009 | A1* | 8/2002 | Umeda .......................... 363/60 |
| 2005/0219878 | A1* | 10/2005 | Ito et al. ........................... 363/59 |
| 2007/0252564 | A1 | 11/2007 | De Nisi et al. ................. 323/268 |
| 2007/0297203 | A1* | 12/2007 | Itoh ................................. 363/60 |
| 2008/0007322 | A1* | 1/2008 | Asazu et al. ................... 327/536 |
| 2008/0054991 | A1* | 3/2008 | Maejima ....................... 327/536 |
| 2008/0094127 | A1* | 4/2008 | Betser et al. .................. 327/536 |
| 2009/0039947 | A1* | 2/2009 | Williams ...................... 327/536 |

* cited by examiner

Primary Examiner — Fred E Finch, III
(74) Attorney, Agent, or Firm — Allen, Dyer, Doppelt, Milbrath & Gilchrist, P.A.

(57) ABSTRACT

A regulation device may be configured for regulating an output voltage of a charge pump voltage generator. The regulation device may include a first regulation loop capable of generating and delivering, to a first input of the voltage generator, an input voltage depending on the difference between the output voltage and a first reference voltage. The regulating device may also include a charger capable of generating and delivering, to a second input of the voltage generator, a substantially constant charge voltage. An electronic device may include the regulation device.

20 Claims, 2 Drawing Sheets

REGULATION DEVICE FOR A CHARGE PUMP GENERATOR AND CORRESPONDING REGULATION METHOD

FIELD OF THE INVENTION

The present invention relates to a device for regulating the output voltage of a charge pump voltage generator.

BACKGROUND OF THE INVENTION

Charge pump voltage generators make it possible to produce a direct current (DC) electrical voltage higher than a specified supply voltage. In the field of integrated circuits, charge pumps may be used for producing, for example, the high erase and programming voltage $V_{PP}$ for the floating grid transistors of electrically erasable and programmable memories (EEPROM, FLASH, FLASH-EEPROM, etc.).

A charge pump is conventionally controlled by clock signals of opposite phase supplied by an oscillator. The charge pump may include a plurality of cascaded pump stages whose structure may be well known to those skilled in the art. The charge pump receives as an input, a supply voltage $V_C$ of 2 to 5 volts. The amplitude of the output voltage $V_{PP}$ depends on the total number of pump stages in cascade and is proportional to the supply voltage $V_C$.

Typically, to program or to erase an EEPROM memory, the charge pump voltage generator must be able to supply a voltage of 15 to 18 V with a current of some tens of microamps. If the voltage applied to the memory is too small, the memory cells programmed or erased are in an uncertain state. The result of this is that the memory will not be functional. On the contrary, if the voltage applied to the memory is too high, the transistors of the memory cells and of the high voltage stage initially undergo a stress which reduces the operational lifetime of the memory (aging of the transistors, breakdown of the grid oxides of the floating grid transistors, etc.). For these reasons, it is recommended to limit the variations of the high voltage applied to the memory to about 1 V. These variations take account of the variations in temperature, of the supply voltage, of the output consumption of the charge pump, of the manufacturing technology of the memory, of the frequency of the oscillator, and of the presence of stray resistances or capacitances, etc.

The charge pump of a voltage generator is generally provided with a number of pump stages greater than the theoretically sufficient number of stages to be able to support a large range of operating voltages and to compensate for the high internal impedance of the charge pump. Because of this, after a start-up period, the charge pump can deliver a voltage $V_{PP}$ greater than the threshold $V_{PPmax}$ beyond which transistors to be erased or programmed could be damaged. On the other hand, the supply voltage $V_C$ can fluctuate strongly (plus or minus 10%) with respect to its nominal value taken into account during the design of the charge pump, and an increase in the voltage $V_C$ can give rise to a corresponding increase in the voltage $V_{PP}$ beyond the threshold $V_{PPmax}$. Control of the voltage $V_{PP}$ is provided to not exceed the threshold $V_{PPmax}$. This control can be provided by a voltage regulation circuit.

Such a regulation circuit can, for example, control the frequency of the oscillator controlling the charge pump. The oscillator can thus be a voltage controlled oscillator, and the regulation circuit then delivers a control voltage to the input of the oscillator. However, a voltage controlled oscillator has a small frequency range, and it is difficult to design such an oscillator which is robust with respect to variations in temperature or load current. Moreover, such an approach also exhibits variable frequency interference noise.

It is also possible to provide a regulation circuit which stops or activates the voltage generator depending on whether the voltage to be regulated is above or below a set voltage. More precisely, the circuit provides a control signal to an activation input of the oscillator of the charge pump according to the comparison between the output voltage $V_{PP}$ and a reference voltage. However, the regulation carried out by such a circuit has a relatively slow instantaneous response. In particular, it does not make it possible to absorb a transient overvoltage at the output of the charge pump. An overvoltage at the level of the supply voltage $V_C$ can give rise to a sudden increase in the amplitude of one of the clock signals. There is a risk that the sudden increase will be instantaneously reflected, by the charge pump, in the form of an overvoltage on the voltage $V_{PP}$, principally because the reaction of the charge pump to a stop command is not instantaneous. The result of this is that the overvoltage, which thus appears in the voltage $V_{PP}$, exceeds the reference voltage before the charge pump is stopped, and can therefore damage the dipole fed by the charge pump. Moreover, such an approach also exhibits variable frequency noise interference.

Finally, it is also possible to provide a regulation circuit which controls the efficiency of the oscillator to control the transfer of charges. However, by reducing the efficiency of the oscillator, the efficiency of the circuit is also reduced, which involves energy losses. Moreover, the frequency response of the charge pump is not linear, which causes stability difficulties in the circuit when a control loop is used.

SUMMARY OF THE INVENTION

According to one embodiment, a device may make it possible to obtain the desired voltage with increased speed and which exhibits better stability. According to one embodiment, a device may have reduced operating consumption and energy losses.

For this purpose, according to one aspect, a regulation device may be configured for regulating an output voltage of a charge pump voltage generator. The regulation device may include a first regulation loop capable of generating and delivering, to a first input of the voltage generator, an input voltage depending on the difference between the output voltage and a first reference voltage, and a charger capable of generating and delivering, to a second input of the voltage generator, a substantially constant charge voltage. Because of a substantially constant charge voltage, it may be possible to regulate the output voltage of the charge pump based upon the input voltage. In fact, as the variations in the charge voltage are small, the variations in the output voltage therefore depend on the losses in the device, and the amplitude of variation of the input voltage becomes sufficient for regulating the output voltage. Finally, by controlling the charge voltage of the charge pump, repercussion of the variations in supply voltage on the output voltage of the charge pump may be limited.

According to one embodiment, the first regulation loop may include a first comparator and a first regulator capable of delivering the input voltage. The first comparator may include a first input for receiving the output voltage of the voltage generator, a second input for receiving the first reference voltage, and an output for delivering a comparison signal to the first regulator. The first regulation loop may make it possible to control the charge pump in such a way as to limit the difference between the output voltage $V_{PP}$ and the desired voltage represented by the first reference voltage.

According to one embodiment, the charger may include an input for receiving a supply voltage able to vary between a low value and a high value. The device may also include a second regulation loop capable of delivering a command to the charger depending on the difference between the charge voltage and a second reference voltage lower than the low value of the supply voltage. The second regulation loop may make it possible to obtain a substantially constant charge voltage. Moreover, the choice of a charge voltage lower than the low value of the supply voltage may make it possible to be free of variations of the supply voltage in the charge voltage. In this case, the second regulation loop may include a second comparator and a second regulator capable of delivering a control signal to the charger to reduce the difference between the charge voltage and the second reference voltage. The second comparator may include a first input for receiving the second reference voltage, a second input for receiving the charge voltage delivered by the output of the charger and an output for delivering a comparison signal to the second regulator.

The device preferably also may include a switching circuit controlled by a control signal for applying, as the second reference voltage, a first voltage level in operational mode of the device or a second voltage level in standby mode of the device. The switching circuit makes it possible to put the charge pump device into a standby mode, while limiting the losses in the latter.

According to another aspect, an electronic device may include a power supply delivering a supply voltage able to vary between a low value and a high value, a charge pump voltage generator delivering an output voltage, and a regulation device, such as defined above fed by the supply voltage and delivering a charge voltage and an input voltage to the voltage generator.

According to another aspect, a method of regulating an output voltage of a charge pump voltage generator, in which there is an input voltage generated and delivered, to a first input of the voltage generator, and regulated to reduce the difference between the output voltage and a first reference voltage, and a substantially constant charge voltage generated and delivered to a second input of the voltage generator.

BRIEF DESCRIPTION OF THE DRAWINGS

The invention will be better understood on studying a particular embodiment, taken as an example that is in no way limiting and illustrated by the appended drawings.

DETAILED DESCRIPTION OF THE PREFERRED EMBODIMENTS

Figure 1:
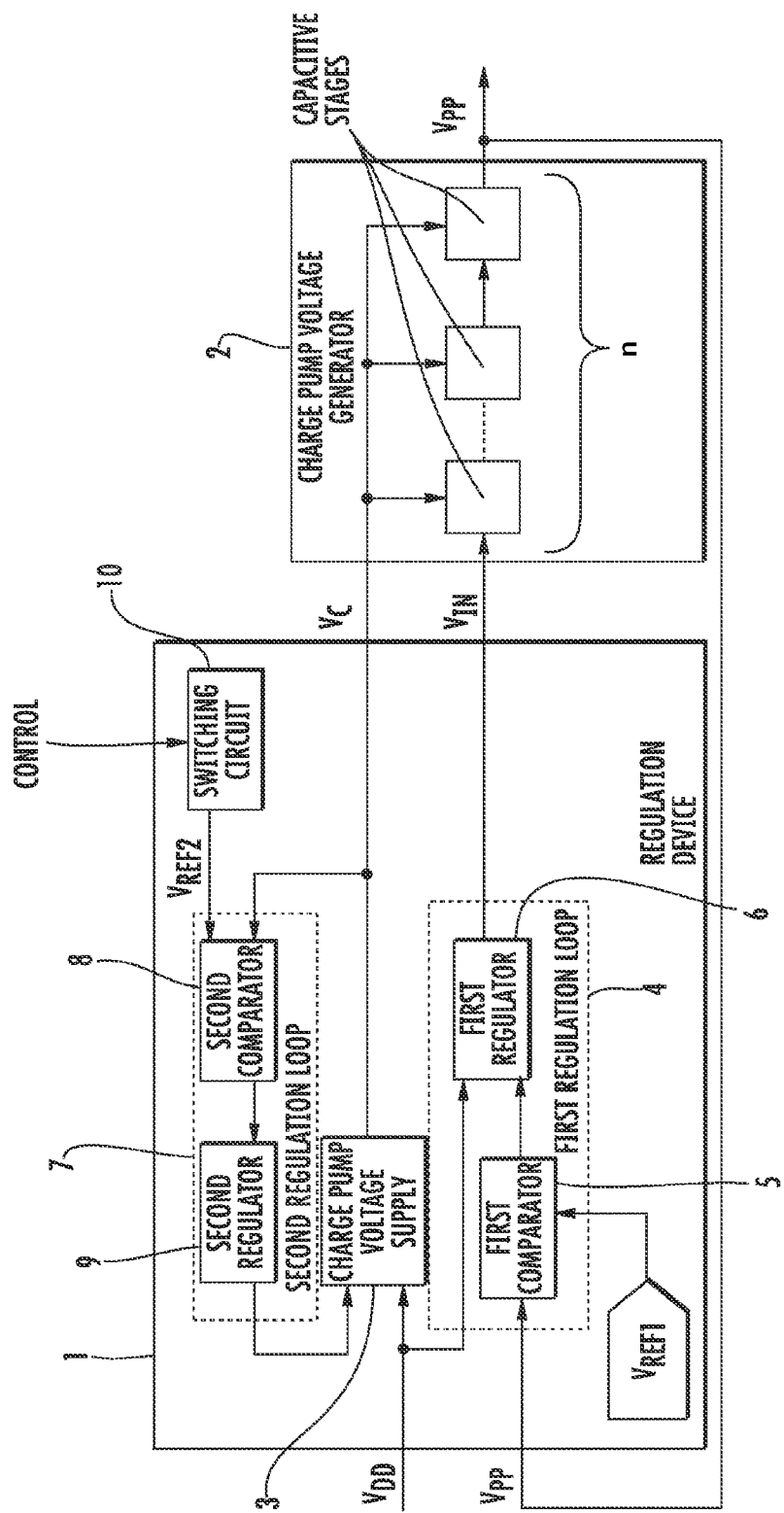
FIG. 1 is a block diagram of an embodiment of the regulating device in accordance with the present invention.

FIG. 1 is a block diagram of a regulation device 1 for a charge pump voltage generator 2. The regulation device 1 delivers a charge voltage $V_C$ and an input voltage $V_{IN}$ to the charge pump 2, to obtain a desired voltage $V_{PP}$ at the output of the charge pump 2.

The charge pump generator 2 includes an oscillator and successive capacitive charge stages for providing an output voltage $V_{PP}$ higher than the supply voltage $V_{DD}$ and higher than the input voltage $V_{IN}$. Such circuit components are well known to those skilled in the art.

More precisely, the successive capacitive charge stages may be produced with switched capacitors. The input voltage $V_{IN}$ is delivered to a first input of the charge pump 2. The first input is coupled with the input of the first capacitive charge stage. The charge voltage $V_C$ is delivered to a second input of the charge pump 2. The second input is coupled with the different capacitive charge stages. The charge voltage $V_C$ makes it possible to charge the capacitors of the stages.

In the rest of the description it is considered that the number of capacitive stages of the charge pump is n. Thus, the output voltage $V_{PP}$ is given by the sum of the input voltage $V_{IN}$ and n times the charge voltage $V_C$, from which the losses are subtracted:

$$V_{PP} = V_{IN} + n \cdot V_C - \text{losses}.$$

The losses depend in particular upon the charge current, the stray resistances or capacitances, the frequency of the oscillator, and the temperature, etc. The regulation device 1 includes a charger 3 and a first regulation loop 4.

The first regulation loop 4 generates the input voltage $V_{IN}$ and delivers it to the charge pump 2. The input voltage $V_{IN}$ is generated in particular in such a way as to compensate for the output voltage $V_{PP}$ losses. The first regulation loop 4 receives, as an input, the output voltage $V_{PP}$, a first reference voltage $V_{REF1}$ and a supply voltage $V_{DD}$. The first regulation loop 4 includes a first comparator 5 and a first regulator 6. The first comparator 5 receives the output voltage $V_{PP}$ and the first reference voltage $V_{REF1}$, and delivers to the first regulator a comparison signal representing the difference between these two values. The first comparator 6 receives, to an input, the supply voltage $V_{DD}$ and the comparison signal, and supplies, as an output, the input signal $V_{IN}$ whose value is between 0 and the value of the supply voltage $V_{DD}$. Depending on the comparison signal, the first regulator 6 then generates the input signal $V_{IN}$ such that the difference determined by the first comparator reduces. In other words, the difference between the output voltage $V_{PP}$ and the first reference voltage $V_{REF1}$ reduces.

The charger 3 generates the charge voltage $V_C$ and delivers it to the charge pump 2. In particular, the charger 3 receives, as an input, a supply voltage $V_{DD}$ which can vary between a low value and a high value. As the variation in the supply voltage $V_{DD}$ can reach as much as 10% of the nominal value of the supply voltage, the latter does not directly feed the charge pump (whose output voltage $V_{PP}$ depends on the voltage applied to the capacitive stages) but is delivered to the input of the charger 3. The purpose of the charger 3 is to deliver a substantially constant charge voltage $V_C$ to the charge pump 2, such that the contribution of the capacitive stages (n·$V_C$ component) to the output voltage $V_{PP}$ varies little over time. For this purpose, the charge voltage $V_C$ is chosen to be lower than the low value of the supply voltage $V_{DD}$, and a second regulation loop 7 is provided for regulating the charge voltage $V_C$.

The second regulation loop 7 generates a control signal and delivers it to the charger 3. The control signal is generated in particular in such a way as to reduce the variations in the charge voltage $V_C$ delivered by the charger 3. The second regulation loop 7 thus receives, as an input, the charge voltage $V_C$ and a second reference voltage $V_{REF2}$ (chosen to be lower than the low value of the supply voltage $V_{DD}$). The second regulation loop 7 includes a second comparator 8 and a second regulator 9. The second comparator 8 receives the charge voltage $V_C$ and the second reference voltage $V_{REF2}$, and delivers a comparison signal representing the difference between these two signals to the second regulator. Depending on the comparison signal, the second regulator 9 then generates the control signal to maintain the charge voltage $V_C$ at a substantially constant value.

At the output of the charge pump 2 is an output voltage $V_{PP}$ whose capacitive component ($n \cdot V_C$) is substantially constant and whose input component ($V_{IN}$) compensates for the losses. The output voltage $V_{PP}$ therefore depends less on the variations in the supply voltage and varies little as a function of the losses. The output voltage is thus regulated.

The regulation of the charge voltage $V_C$ makes it possible to avoid excess charges in the charge pump and therefore overvoltages at the level of the output voltage $V_{PP}$. Finally, as the input voltage $V_{IN}$ is regulated in such a way as to compensate for the losses, the energy consumed by the system corresponds to that required plus the losses. In other words, there is no loss due to a possible overvoltage. Finally, the regulation of the output voltage $V_{PP}$ by the input voltage $V_{IN}$, and not by the control of the oscillator of the charge pump, makes it possible to obtain a pseudo-linear behavior of the system, which facilitates its control and its stability.

In particular, it will be understood that the second reference voltage, which makes it possible to regulate the charge voltage $V_C$, and the number n of charge stages of the charge pump 2 are chosen such that the product of these two values is substantially below the desired output voltage $V_{PP}$. The input voltage $V_{IN}$ will then be regulated in such a way as to be substantially higher than the losses.

To reduce the losses during periods of inactivity, the regulation device includes a switching circuit 10 to apply, as the second reference voltage $V_{REF2}$, a first voltage level $V_{REF21}$ in an operational mode or a second voltage level $V_{REF22}$ in a standby mode. This switching circuit 10 is controlled by a control signal, which is the signal for putting the charge pump voltage generator 2 into the standby mode, generated internally by a control circuit. Thus, when the control signal is inactive, which signifies that the device is in the operational mode, the voltage level applied as the second reference voltage $V_{REF2}$ is the first level $V_{REF21}$. The output voltage $V_{PP}$, of the charge pump 2, is taken to and maintained at a high value by the regulation device 1. In the standby mode, it is the second level $V_{REF22}$ that is applied as the reference voltage $V_{REF2}$. The output voltage $V_{PP}$, at the output of the charge pump 2, is taken to and maintained at a low value, for example, zero. In this latter case, only the switching circuit and the second regulation loop may be powered. The rest of the system, in particular the charge pump 2, is no longer powered and therefore consumes less energy. The energy losses in the system are therefore reduced during standby periods.

Figure 2:
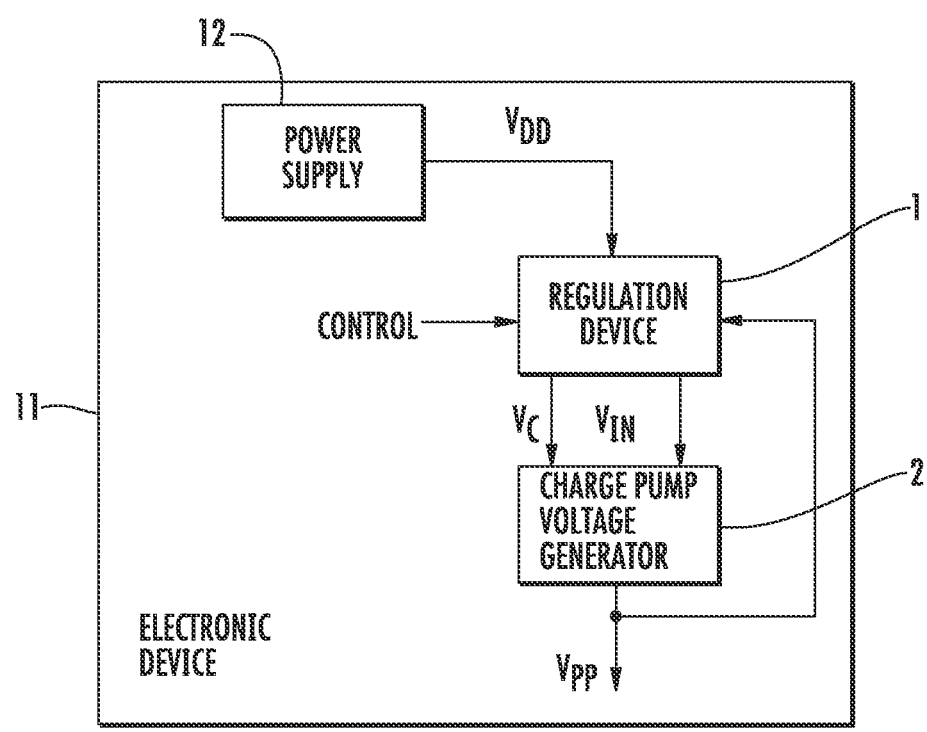
FIG. 2 is a block diagram of an electronic device including the regulating device of FIG. 1.

The regulation device 1 can thus be used in any type of electronic device 11, such as shown in FIG. 2. The electronic device 11 includes a power supply 12 delivering a supply voltage $V_{DD}$ which can vary between a low value and a high value to the regulation device 1. The regulation device 1 then delivers, to a charge pump 2, a charge voltage $V_C$ and an input voltage $V_{IN}$ to obtain the desired value $V_{PP}$ as the output voltage.

That which is claimed is:

1. A device comprising:
    a charge pump voltage generator having first and second inputs and a plurality of charge stages; and
    a regulation device configured to regulate an output voltage of said charge pump voltage generator, and comprising
        a first regulation loop configured to generate and deliver to the first input of the charge pump voltage generator, an input voltage that is based upon a difference between the output voltage and a first reference voltage,
        a charge pump voltage supply having an input configured to receive a supply voltage that varies between a low value and a high value, and configured to generate and deliver, to the second input of the charge pump voltage generator, a constant charge voltage while the charge pump voltage generator is operated, the constant charge voltage having a value that is lower than the low value of the supply voltage, the supply voltage not feeding said charge pump voltage generator, and the output voltage being regulated by the input voltage independent of an oscillator of said charge pump voltage generator, and
        a second regulation loop configured to deliver a command to said charge pump voltage supply based upon a difference between the constant charge voltage and a second reference voltage, a product of a number of the plurality of charge stages and the second reference voltage being less than the output voltage.

2. The device according to claim 1, wherein said first regulation loop comprises:
    a first comparator; and
    a first regulator configured to deliver the input voltage;
    said first comparator having a first input configured to receive the output voltage of the said charge pump voltage generator, a second input configured to receive the first reference voltage, and an output configured to deliver a comparison signal to said first regulator.

3. The device according to claim 1, wherein the second reference voltage is lower than the low value of the supply voltage.

4. The device according to claim 1, wherein said second regulation loop comprises:
    a second comparator; and
    a second regulator configured to deliver a control signal to the charge pump voltage supply to reduce the difference between the constant charge voltage and the second reference voltage;
    said second comparator having a first input configured to receive the second reference voltage, a second input configured to receive the constant charge voltage delivered by the output of the charge pump voltage supply, and an output configured to deliver a comparison signal to said second regulator.

5. The device according to claim 4, further comprising a switching circuit controlled by a control signal for applying, as the second reference voltage, one of a first voltage level in an operational mode of the regulation device and a second voltage level in a standby mode of the regulation device.

6. A regulation device configured to regulate an output voltage of a charge pump voltage generator having first and second inputs and a plurality of charge stages, the regulation device comprising:
    a first regulation loop configured to generate and deliver to the first input of the charge pump voltage generator, an input voltage that is based upon a difference between the output voltage and a first reference voltage;
    a charge pump voltage supply having an input configured to receive a supply voltage that varies between a low value and a high value, and configured to generate and deliver, to the second input of the charge pump voltage generator, a constant charge voltage while the charge pump voltage generator is operated, the constant charge voltage having a value that is lower than the low value of the supply voltage, the supply voltage not feeding the charge pump voltage generator, and the output voltage being regulated by the input voltage independent of an oscillator of the charge pump voltage generator; and
    a second regulation loop configured to deliver a command to said charge pump voltage supply based upon a difference between the constant charge voltage and a second reference voltage, a product of a number of the plurality of charge stages and the second reference voltage being less than the output voltage.

7. The regulation device according to claim 6, wherein said first regulation loop comprises:
   a first comparator; and
   a first regulator configured to deliver the input voltage;
   said first comparator having a first input configured to receive the output voltage of the charge pump voltage generator, a second input configured to receive the first reference voltage, and an output configured to deliver a comparison signal to said first regulator.

8. The regulation device according to claim 6, wherein the second reference voltage is lower than the low value of the supply voltage.

9. The regulation device according to claim 6, wherein said second regulation loop comprises:
   a second comparator; and
   a second regulator configured to deliver a control signal to the charge pump voltage supply to reduce the difference between the constant charge voltage and the second reference voltage;
   said second comparator having a first input configured to receive the second reference voltage, a second input configured to receive the constant charge voltage delivered by the output of the charge pump voltage supply, and an output configured to deliver a comparison signal to the second regulator.

10. The regulation device according to claim 9, further comprising a switching circuit controlled by a control signal for applying, as the second reference voltage, one of a first voltage level in an operational mode of the regulation device and a second voltage level in a standby mode of the regulation device.

11. An electronic device comprising:
   a power supply configured to deliver a supply voltage that varies between a low value and a high value;
   a charge pump voltage generator having first and second inputs, a plurality of charge stages, and configured to deliver an output voltage;
   a regulation device configured to regulate the output voltage, said regulation device being fed by the supply voltage and configured to deliver a charge voltage and an input voltage to the charge pump voltage generator;
   said regulation device comprising
      a first regulation loop configured to generate and deliver to the first input of the charge pump voltage generator, the input voltage is based upon a difference between the output voltage and a first reference voltage,
      a charge pump voltage supply having an input configured to receive a supply voltage that varies between a low value and a high value, and configured to generate and deliver, to the second input of the charge pump voltage generator, a constant charge voltage while the charge pump voltage generator is operated, the constant charge voltage having a value that is lower than the low value of the supply voltage, the supply voltage not feeding said charge pump voltage generator, and the output voltage being based regulated by the input voltage independent of an oscillator of said charge pump voltage generator, and
      a second regulation loop configured to deliver a command to said charge pump voltage supply based upon a difference between the constant charge voltage and a second reference voltage, a product of a number of the plurality of charge stages and the second reference voltage being less than the output voltage.

12. The electronic device according to claim 11, wherein said first regulation loop comprises:
   a first comparator; and
   a first regulator configured to deliver the input voltage;
   said first comparator having a first input configured to receive the output voltage of said charge pump voltage generator, a second input configured to receive the first reference voltage, and an output configured to deliver a comparison signal to said first regulator.

13. The electronic device according to claim 11, wherein said second regulation loop comprises:
   a second comparator; and
   a second regulator configured to deliver a control signal to the charge pump voltage supply to reduce the difference between the constant charge voltage and the second reference voltage;
   said second comparator having a first input configured to receive the second reference voltage, a second input configured to receive the constant charge voltage delivered by the output of the charge pump voltage supply, and an output configured to deliver a comparison signal to said second regulator.

14. The electronic device according to claim 11, wherein the second reference voltage is lower than the low value of the supply voltage.

15. The electronic device according to claim 14, further comprising a switching circuit controlled by a control signal for applying, as the second reference voltage, one of a first voltage level in an operational mode of the regulation device and a second voltage level in a standby mode of the regulation device.

16. A method of regulating an output voltage of a charge pump voltage generator comprising:
   operating a first regulation loop of a regulation device to generate and deliver, to a first input of the charge pump voltage generator, an input voltage regulated to reduce the difference between the output voltage and a first reference voltage;
   operating a charge pump voltage supply of the regulation device, and having an input receiving a supply voltage that varies between a low value and a high value, to generate and deliver, to a second input of the charge pump voltage generator, a constant charge voltage while operating the charge pump voltage generator, the constant charge voltage having a value that is lower than the low value of the supply voltage, the supply voltage not feeding the charge pump voltage generator, and the output voltage being based regulated by the input voltage independent of an oscillator of the charge pump voltage generator; and
   operating a second regulation loop of the regulation device to deliver a command to the charge pump voltage supply based upon a difference between the constant charge voltage and a second reference voltage, a product of a number of a plurality of charge stages of the charge pump voltage generator and the second reference voltage being less than the output voltage.

17. The method according to claim 16, wherein the regulation device further comprises a first comparator and a first regulator configured to deliver the input voltage, the first comparator having a first input configured to receive the output voltage of the charge pump voltage generator, a second input configured to receive the first reference voltage, and an output; and wherein the method further comprises operating the first comparator to deliver a comparison signal to the first regulator.

18. The method according to claim 16, wherein the second reference voltage is lower than the low value of the supply voltage.

19. The method according to claim 16, wherein the second regulation loop comprises a second comparator and a second regulator configured to deliver a control signal to the charge pump voltage supply to reduce the difference between the charge voltage and the second reference voltage, the second comparator having a first input configured to receive the second reference voltage, a second input configured to receive the charge voltage delivered by the output of the charge pump voltage supply; and wherein the method further comprises operating the second comparator to deliver at an output, a comparison signal to the second regulator.

20. The method according to claim 19, wherein the regulation device further comprises a switching circuit controlled by a control signal for applying, as the second reference voltage; and wherein the method further comprises operating the switching circuit to apply one of a first voltage level in an operational mode of the regulation device and a second voltage level in a standby mode of the regulation device.

* * * * *